United States Patent [19]

Kadokura et al.

[11] Patent Number: 4,961,889

[45] Date of Patent: Oct. 9, 1990

[54] PROCESS FOR PRODUCING INORGANIC FIBER

[75] Inventors: Hidekimi Kadokura; Masashi Harakawa, both of Niihama; Nagatoshi Nogami, Ibaraki, all of Japan

[73] Assignee: Sumitomo Chemical Company, Limited, Osaka, Japan

[21] Appl. No.: 385,955

[22] Filed: Jul. 28, 1989

Related U.S. Application Data

[63] Continuation of Ser. No. 789,963, filed as PCT JP85/00177 on Apr. 8, 1985, published as WO85/0467 on Oct. 24, 1985, abandoned.

[30] Foreign Application Priority Data

Apr. 10, 1984 [JP] Japan .................................. 59-72471

[51] Int. Cl.$^5$ ............................................. C04B 35/64
[52] U.S. Cl. .................. 264/63; 264/211.11; 264/DIG. 19
[58] Field of Search ............. 264/63, DIG. 19, 211.11

[56] References Cited

U.S. PATENT DOCUMENTS 4,101,615  7/1978  Horikiri et al. ...................... 264/63
4,515,742  5/1985  Yajima et al. ............... 264/DIG. 19
4,535,007  8/1985  Cannady ........................... 264/29.2

FOREIGN PATENT DOCUMENTS 0083839    7/1983   European Pat. Off. .
49-124336  11/1974  Japan .
50-18726   2/1975   Japan .
50-136424  10/1975  Japan .
51-13768   5/1976   Japan .
58-91825   5/1983   Japan .
1457801    12/1976  United Kingdom .

*Primary Examiner*—James Derrington
*Attorney, Agent, or Firm*—Stevens, Davis, Miller & Mosher

[57] ABSTRACT

A process for producing an inorganic fiber superior in stretchability, which comprises; heating either a solution of a polymetalloxane in an organic solvent, the polymetalloxane content in the solution being at least 85% by weight and the viscosity of the solution at 25° C. being at least 5000 poises, or a solid state polymetalloxane to prepare a spinning liquid having a viscosity of 1 to 3000 poises; spinning the spinning liquid to form a precursor fiber; and baking the precursor fiber.

1 Claim, No Drawings

PROCESS FOR PRODUCING INORGANIC FIBER

This application is a continuation of application Ser. No. 789,963, filed as PCT JP85/00177 on Apr. 8, 1985, published as WO85/0467 on Oct. 24, 1985 now abandoned.

TECHNICAL FIELD

The present invention relates to a process for producing an inorganic fiber. More particularly, the invention relates to a process for producing an inorganic fiber, specially an alumina fiber or an alumina-silica fiber, superior in stretchability and mechanical strength, from a polymetalloxane.

BACKGROUND ART

In recent years, technical progress in many industries including primarily the aircraft industry, created the need for the development of materials superior to conventional materials in physical and mechanical properties, such as, heat resistance at elevated temperatures.

It is generally known to improve, the physical properties of commentional material to reinforcing them with; carbon fibers; fibers of metals such as tungsten, molybdenum, and steel; composite fibers resulting from covering the surface of tungsten filaments with boron, silicon carbide, or the like; polycrystalline fibers of alumina, zirconia, and the like; and whiskers of silicon carbide and some other material.

Metal oxide fibers, one group of these reinforcements for composite materials, have characteristics such that they can be used in high temperature oxidative atmospheres wherein neither carbon fibers nor metallic fibers will be utilizable. Metal oxide fibers do not lose the superior mechanical property at high temperatures because of their generally high melting points. Accordingly, metal oxide fibers are expected to be used not only as compounding reinforcements but also over a wide range of applications in various industrial fields.

The present applicant has previously proposed processes for producing inorganic fibers, for example, alumina, alumina-silica, titania, and zirconia fibers, using polymetalloxane solutions of room temperature viscosities 1 to 5000 poises as starting materials (Japanese Patent Publication Nos. 12,736/76 and 13,768/76 and Japanese Patent Application Laid-Open Nos. 124,336/74, 136,424/75, and 18726/75).

The above processes have various advantages over other methods in that the metal oxide contents in precursor fibers are high and this results in dense fibers after baking, in that the fibers have high tenacity and high elasticity, and in that the spinning solutions exhibit good spinnability because of their homogeneity.

However, the above processes have drawbacks in that fiber at least 2 cm in length cannot be attained when the polymetalloxane solutions are used as spinning solutions specially for producing short fibers of about 3 μm in filament diameter. Also small filament diameters of 10 μm and less are difficult to attain when producing continuous fibers. Therefore, it is desired to achieve better fiber stretchability.

DISCLOSURE OF THE INVENTION

In view of the above, the present inventors made intensive studies so as to produce better inorganic fibers than those from the above processes, and as a result found that, when a highly concentrated and extremely viscous solution of a polymetalloxane in an organic solvent or a solid state polymetalloxane is heated and spun, stretchability is excellent and an inorganic fiber having better mechanical strength can be produced by baking the precursor fiber resulting from said hot spinning. Thus the object of the invention has been accomplished.

OBJECT OF THE INVENTION

An object of the invention is to provide a process for producing an inorganic fiber superior in stretchability and mechanical strength.

That is to say, according to the invention, there is provided a process for producing an inorganic fiber, which comprises; heating either a solution of a polymetalloxane in an organic solvent, the polymetalloxane content in the solution being at least 85% by weight and the viscosity of the solution at 25° C. being at least 5000 poises, preferably at least 6000 poises, or a solid state polymetalloxane to prepare a spinning liquid having a viscosity of 1 to 3000 poises; spinning the spinning liquid to form a precursor fiber; and baking the precursor fiber.

BEST MODE FOR CARRYING OUT THE INVENTION

The process of the invention is described below in more detail.

In the process of the invention, the feed used for the spinning liquid is either a solution of a polymetalloxane in an organic solvent, the polymetalloxane content in the solution being at least 85% by weight and the viscosity of the solution at 25° C. being at least 5000 poises, or a solid state polymetalloxane.

If the polymetalloxane content in the spinning liquid is less than 85% by weight, the metal oxide content in the precursor fiber will be low and the compactness of the baked fiber will be deteriorated, resulting in decreases in the tenacity and elastic modulus of the fiber. Hence, such a metalloxane content is undesirable. Preferably the polymetalloxane content in the spinning liquid is 90% or more, particularly from 95 to 100%, by weight.

In addition, the spinning material needs to be either a solution of a polymetalloxane in an organic solvent, the viscosity of the solution being at least 5000 poises (preferably at least 6000 poises) at 25° C. or a solid state polymetalloxane. If the viscosity is below the above defined limit, a large amount of the organic solvent will be contained and the spun precursor fiber will be inferior in tenacity because it is made porous and nonuniform by the evaporation of the solvent. Since spinning is conducted under heating, and filament breaking will occur on fining the precursor fiber by stretching, conceivably because of the large amount of solvent evaporation.

That is, the following difficulties arise: in the preparation of a continuous precursor fiber, filament break will occur if it is stretched to 10 μm or less in filament diameter; on the other hand, in the preparation of a short fiber, where the filament diameter is usually several μm, it will be impossible to attain a filament length of about 20 mm or more.

The raw material polymetalloxanes used in the invention are represented by the general formula

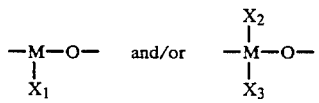

($X_1$, $X_2$, and $X_3$ represent each an organic residue, hydrogen, or halogen). While any degree of polymerization 2 or more of the polymetalloxane is acceptable, generally, a polymetalloxane having a degree of polymerization up to 1000 is used.

The M in the above general formula may be any metal provided that it can be converted into an oxide of the metal by baking, but generally metal atoms capable of assuming trivalent or tetravalent form are useful, including, for example, boron, aluminum, gallium, indium, silicon, germanium, tin, lead, yttrium, titanium, zirconium, rare earth elements, chromium, manganese, iron, cobalt, and nickel. In particular, aluminum, silicon, titanium, and zirconium are useful.

$X_1$, $X_2$, and $X_3$ represent one or more species of organic residues, hydrogen atoms, or halogen atoms, including, for example; alkyl groups such as methyl, ethyl, n-propyl, isopropyl, n-butyl, and isobutyl groups; alkoxy groups such as methoxy, ethoxy, n-propoxy, isopropoxy, n-butoxy, and isobutoxy groups; acyl groups such as acetyl, propionyl, and benzoyl groups; alkoxycarbonyl groups such as methoxycarbonyl, ethoxycarbonyl, and propoxycarbonyl groups; phenoxycarbonyl group; alkenyl groups such as vinyl and propenyl groups; unsubstituted or substituted phenyl groups; unsubstituted or substituted phenoxy groups; and halogens such as chlorine and fluorine.

The polymetalloxanes can be prepared by the following methods:

The partial hydrolysis of metal organic compounds, for example, trimethylaluminum, triethylaluminum, tripropylaluminum, triisopropylaluminum, tributylaluminum, triisobutylaluminum, diethylaluminum halide, diethylaluminum hydride, trimethoxyaluminum, triethoxyaluminum, triisopropoxyaluminum, monoethoxydiethylaluminum, monoisopropoxy diethylaluminum, diethoxymonoethylaluminum, diisopropoxymonoethylaluminum, tetraethyltitanium, tetrapropyltitanium, tetrabutyltitanium, tetraethoxytitanium, tetraisopropoxytitanium, tetrabutoxytitanium, triethyltitanium hydride, diethyldiisopropoxytitanium, tetraethylzirconium, tetraisopropoxyzirconium, tetrabutylzirconium, trimethylzirconium hydride, diethylisopropoxyzirconium, tetraethylsilicon, tetrapropylsilicon, methyl silicate, ethyl silicate, isopropyl silicate, trimethylindium, triethylindium, triethoxyindium, diethylisopropoxyindium, tetramethyltin, tetraethyltin, tetrapropyltin, tetramethoxytin, tetraethoxytin, and tetraisopropoxytin, or the replacement of organic residues of the resulting polymetalloxanes by other suitable residues, respectively. The partial hydrolysis can be carried out under known conditions.

A polymetalloxane which has a viscosity of 5000 poises or more at 25° C. or which has been prepared in a solid state can be used directly for the spinning liquid. When a polymetalloxane solution which has been prepared using an organic solvent and has a viscosity of less than 5000 poises at 25° C. is used as the spinning solution, a considerable amount of the organic solvent still remains in the spinning solution and therefore the metal oxide content therein and in the polymetalloxane is low. Accordingly, the polymetalloxane solution is used after the metal oxide content therein has been elevated by concentrating the solution so that the viscosity thereof at 25° C. will become at least 5000 poises, preferably at least 6000 poises or the solution will become solid-like, for example, in a nearly solid state.

In the process of the invention, either a polymetalloxane solution which contains the polymetalloxane in a concentration of at least 85% by weight and has a viscosity of at least 5000 poises, preferably at least 6000 poises at 25° C. or a solid state polymetalloxane is then heated for use as a spinning liquid having a viscosity of 1 to 3000 poises, preferably 10 to 1000 poises.

If the viscosity of the spinning liquid is lower than 1 poise, the resulting fiber will be nonuniform in filament diameter, or worse in filament shape, and will be inferior in tenacity. On the other hand, if the viscosity is higher than 3000 poises, spinning will be difficult. Therefore such viscosities of the spinning liquid are undesirable.

Heating is carried out usually at a temperature from the ordinary to 300° C., preferably from 40° to 250° C., particularly from 50° to 200° C., depending on the heat stability of the polymetalloxane.

The temperature of heating the spinning liquid is selected taking into consideration that the optimum temperature depends upon the nature and degree of polymerization the polymetalloxane, the amount of the organic solvent, etc.

In the process of the invention, the spinning liquid, adjusted by heating to give a viscosity of from 1 to 3000 poises, is spun into the precursor fiber.

For spinning, known methods such as extrusion through a spinneret, centrifugal spinning, and blowing spinning are adaptable.

As regards the spinning head, those having a heating mechanism in the section where the spinning liquid stagnates are preferably used in view of the stability of spinning.

It is specially favorable to stretch the precursor fiber by means of rotating rollers or a high-speed stream of air in the spinning.

For the steady production of good fibers, it is desirable to control the temperature and humidity of the spinning atmosphere and those of the blow-off air in the spinning.

Stretchability, the lack of which has been a drawback in the prior art processes, can be markedly improved by spinning under such conditions as stated above. For instance, in the case of continuous fibers, the draft ratio can be raised to at least 30:1 and in consequence fibers of 5 to 10 μm in baked filament diameter become spinnable; in the case of short fibers, a filament length of at least 30 mm and if desired, 50 mm or more becomes attainable. Thus the effect of the improvement is remarkable.

In the process of the invention, the precursor fiber spun as described above is pre-treated with water vapor, hot water, or both of them as required, and then is baked.

The inorganic precursor fiber spun in the air becomes substantially infusible through hydrolysis with moisture in the air. However, if this is insufficient, the precursor fiber is subjected to a suitable treatment for making it infusible, and then can be readily converted into an inorganic fiber, without getting out of shape, by baking in an atmosphere of oxygen-containing gas such as air.

To explain this with reference to the production of an alumina fiber as an example, the precursor fiber, when baked in an atmosphere of oxygen-containing gas, e.g. air, turns substantially into an alumina fiber at about 700° C., and a transparent and strong alumina fiber is obtained therefrom at a temperature of about 900° C. or higher.

For the purpose of producing various alumina fibers, the precursor fiber may or may not be baked in an atmosphere of inert gas such as nitrogen or in vacuo and then exposed to an oxygen-containing atmosphere to remove the organic matter or carbonaceous matter.

The resultant alumina fiber can also be baked further in an atmosphere of reducing gas such as hydrogen.

It is desirable to exert tension on the precursor fiber or alumina fiber during the baking step.

The optimum baking temperature depends upon the elements constituting the inorganic fiber to be produced and the end use of the fiber. When a high tenacity and high elastic modulus fiber, such as a reinforcing fiber for composite materials, is necessary baking temperatures are 900° to 1800° C. for the alumina fiber, 900° to 1500° C. for the silica-alumina fiber, 800° to 1500° C. for the titania fiber, and 1000° to 1500° C. for the zirconia fiber. When applied to catalysts (or catalyst carriers), fibers of large specific surface areas are generally advantageous. For the alumina, silica-alumina, and zirconia fibers to be used for this purpose, baking temperatures of from 400° to 1500° C. are adopted according to conditions of the chemical reaction for which the catalyst fiber will be used.

Further, when the ionic conductivity of the product zirconia fiber is utilized, it is desirable to bake the precursor fiber at the well known transition point or higher, that is, at a temperature of about 1000° to about 1100° C. Thus, the baking conditions are varied with the end use of the product fiber and the component oxide.

In the process of the invention, spinnability of the polymetalloxane spinning liquid can be improved by adding thereto an organic polymer such polyethylene glycol, polypropylene glycol, poly(vinyl formal), or poly(vinyl acetate), or some other suitable organic substance.

A complex oxide type [e.g. a spinel type of oxide (MgAl$_2$O$_4$ Apinel, Al-Si spinel, or the like) or a perovskite type of oxide (LaAlO$_3$)] of fiber having superior properties can also be produced by mixing two or more polymetalloxanes different in constituent metal atom from one another, followed by spinning and baking.

In the process of the invention, a short, long, or continuous silica-alumina fiber having very high mechanical strength and heat resistance can be produced by using polyaluminoxane as a raw material, mixing a silicon-containing compound therewith, spinning the mixture, and baking the resulting precursor fiber of high silica-alumina content.

For the silicon-containing compound to be mixed, poly(silisic acid esters) having a structural unit of $$\begin{array}{c} OR_1 \\ | \\ -Si-O- \\ | \\ OR_2 \end{array}$$

(R$_1$ and R$_2$ are organic residues) are appropriate, though there may be used organosilanes having the structure R$_n$SiX$_{4-n}$ (X is OH or OR, R is an organic residue, and n is an integer of up to 4), silisic acid esters having the structure Si(OR)$_4$ (R is an organic residue), and other silicon-containing compounds.

For mixing with the polyaluminoxane, silicon-containing compounds uniformly soluble therein are preferable in that spinnability is improved, though those insoluble but dispersible therein can be used.

While the maximum quantity of a silicon-containing compound that can be used depends also upon the spinnability of the silicon-containing compound itself, the polyaluminoxane will retain enough spinnability even if a silicon-containing compound having no spinnability is used therewith, and the quantity of the silicon-containing compound is as large as the silica content in the baked silica-alumina fiber and amounts to 60% by weight.

In the production of silica-alumina fiber, it is desirable to prepare the spinning material so that the SiO$_2$: Al$_2$O$_3$ ratio in the baked fiber will be 1–30 wt. %: 99–70 wt. %.

Embodiments of the invention are illustrated with reference to the following examples; however the invention is not limited to the examples.

EXAMPLE 1

One mole of triisopropoxyaluminum was dissolved in 500 ml of isopropyl alcohol, and 0.1 mole of ethyl o-hydroxybenzoate was added to replace 0.1 mole of the isopropoxy groups of the triisopropoxyaluminoxane with

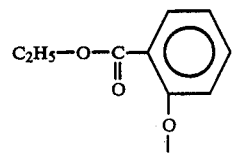

groups. To this solution was added 0.6 mole of water to cause partial hydrolysis, thereby preparing a polyaluminoxane. Ethyl silicate 40 (COLCOAT CO., LTD.) was added thereto so that silica in an amount of 15 wt. % would be contained in the baked fiber, and the mixture was concentrated to a polymetalloxane content of 95%. The concentrate was a transparent and homogenous solid at 25° C.

This solid, heated at 80° C. to give a viscosity of 50 poises, was extruded as a spinning liquid through a spinneret having 6 holes of 50 $\mu$m in diameter to prepare a transparent precursor fiber.

This precursor fiber, after standing for 15 minutes in an 80° C. and 95% RH atmosphere, was baked in a tubular oven by raising the temperature at a rate of 300° C./hr upto 1200° C., yielding a colorless transparent alumina-silica fiber of silica content 15 wt. %.

This fiber was found to have a filament diameter of 6 $\mu$m, tensile strength of 250 kg/mm$^2$, and elastic modulus of 20,000 kg/mm$^2$.

EXAMPLE 2

One mole of triisopropoxyaluminum was dissolved in 500 ml of isopropyl alcohol, and partly hydrolyzed with 0.6 mole of water to give a polyaluminoxane.

To this aluminoxane were added 0.009 mole of poly(-silicic acid ester) represented by the formula

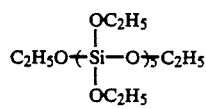

and polypropylene glycol of average molecular weight 6000 in an amount of 1 wt. % based on the polymetalloxane.

The mixture was concentrated to such an extent that the residue was substantially free of isopropyl alcohol. The concentrate was a transparent solid at 25° C.

This solid, heated at 130° C. to give a viscosity of 10 poises, was extruded as a spinning liquid through a spinneret of 200 μm in hole diameter. The extruded filaments were stretched with an air jet to prepare a precursor fiber.

This precursor fiber, after standing for 5 minutes in a 70° C. and 95% RH atmosphere, was baked by raising the temperature at a rate of 200° C./hr upto 1200° C., yielding an alumina-silica fiber.

The diameter and length of 40 filaments of this fiber were found to be on the average 3.3 μm and 40 mm, respectively.

COMPARATIVE EXAMPLE 1

In the same manner as in Example 1, a polyaluminoxane-polysiloxane mixed solution was prepared and concentrated to 78% in polymetalloxane content. The concentrate was a liquid having a viscosity of 4000 poises at 25° C. This liquid, heated at 45° C. to give a viscosity of 200 poises, was extruded as a spinning solution through a spinneret having 6 holes of 50 μm in diameter, and baked in the same manner as in Example 1. The obtained fiber was found to have a filament diameter of 12 μm and a tensile strength of 170 kg/mm$^2$.

COMPARATIVE EXAMPLE 2

A spinning solution having a polymetalloxane content of 58% and a viscosity of 60 poises at 25° C. was prepared in the same manner as in Example 3. This solution, heated at 40° C. to give a viscosity of 10 poises, was spun in the same manner as in Example 3, giving a precursor fiber which partially contained a non-fibrous substance. This precursor fiber was baked in the same manner as in Example 3. The obtained fiber, having on the average a filament diameter of 6.2 μm and a filament length of 4.8 mm, was deficient in flexibility.

INDUSTRIAL APPLICATION

According to the process of the invention described above in detail, it is possible to achieve the superior stretchability difficulty achievable by the known prior art, that is, filaments of small diameter in the case of continuous fibers and filaments of large lengths in the case of short fibers can be produced. The inorganic fibers obtained are comparable or superior in mechanical strength to those obtained according to the prior art. The process of the invention has considerable industrial advantages.

We claim:

1. A process for producing an inorganic fiber superior in stretchability and mechanical strength, which comprises heating a polymetalloxane in solid form at 25° C. to a temperature of 40° to 250° C. to prepare a spinning liquid having a viscosity of 1 to 3000 poises; spinning the spinning liquid to form a precursor fiber; and baking the precursor fiber.

* * * * *